United States Patent
Hattanda

(10) Patent No.: US 9,199,305 B2
(45) Date of Patent: *Dec. 1, 2015

(54) METHOD OF MANUFACTURING RECYCLED PLATE FOR SLIDING NOZZLE AND RECYCLED PLATE

(71) Applicant: TYK CORPORATION, Tokyo (JP)

(72) Inventor: Hirokatsu Hattanda, Tajimi (JP)

(73) Assignee: TYK CORPORATION, Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 14/070,545

(22) Filed: Nov. 3, 2013

(65) Prior Publication Data

US 2014/0131400 A1   May 15, 2014

(30) Foreign Application Priority Data

Nov. 12, 2012  (JP) .................................. 2012-248409

(51) Int. Cl.
*C04B 41/82* (2006.01)
*B22D 41/28* (2006.01)
*B22D 41/30* (2006.01)

(52) U.S. Cl.
CPC ............... *B22D 41/28* (2013.01); *B22D 41/30* (2013.01)

(58) Field of Classification Search
CPC .................................. B22D 41/30; B22D 41/32
USPC .......................................................... 222/600
See application file for complete search history.

(56) References Cited

U.S. PATENT DOCUMENTS

| | | | | |
|---|---|---|---|---|
| 4,555,094 A | * | 11/1985 | Evertz et al. ..................... | 266/45 |
| 2014/0130355 A1 | * | 5/2014 | Hattanda ................... | 29/890.09 |
| 2014/0131400 A1 | * | 5/2014 | Hattanda ...................... | 222/600 |

FOREIGN PATENT DOCUMENTS

JP   2009-233685 B2   10/2009

* cited by examiner

*Primary Examiner* — Scott Kastler
(74) *Attorney, Agent, or Firm* — Yoshida & Associates, LLC

(57) ABSTRACT

The manufacturing method of the recycled plate performs, on a plate used for the sliding nozzle, recycling processing including impregnating a matrix of the plate that is formed by a refractory brick with liquid containing at least one of tar and pitch, heating the plate impregnated with the liquid to remove a volatile component, and filling a recess having an opening width and a depth of equal to or smaller than 1 mm, which is present on a surface of the plate after having been impregnated with the liquid and heated, with a thermal expandable refractory material of which volume is increased by at least one of generation reaction and change in a crystal structure with heating when the plate attached to the sliding nozzle is used.

3 Claims, 4 Drawing Sheets

METHOD OF MANUFACTURING RECYCLED PLATE FOR SLIDING NOZZLE AND RECYCLED PLATE

CROSS REFERENCE TO RELATED APPLICATION

This application claims to the benefit of priority to Japanese Patent Application No. 2012-248409 filed on Nov. 12, 2012, of which full contents are incorporated herein by reference.

BACKGROUND OF THE INVENTION

1. Field of the Invention

The present invention relates to a manufacturing method of a recycled plate for a sliding nozzle and a recycled plate that is manufactured by the manufacturing method. The manufacturing method includes performing processing for extending an endurance period on a plate used for the sliding nozzle that performs discharge control and flow control of molten steel in a steel manufacturing process.

2. Description of the Related Art

A sliding nozzle is a device that is used for discharge control and flow control of molten steel when discharging the molten steel from a molten steel vessel such as a ladle and a tundish in a steel manufacturing process. As illustrated in FIG. 7, a common sliding nozzle 110 includes two plates of a fixed plate 111 and a movable plate 112 that are formed by refractory bricks. The fixed plate 111 is fixed to the bottom portion of an upper nozzle 101 fitted into an opening of a bottom portion 90 of the molten steel vessel. The movable plate 112 is a plate that reciprocates or rotates while sliding relative to the fixed plate 111. A lower nozzle 102 is fixed to the movable plate 112. Holes 111$h$ and 112$h$ penetrate through the fixed plate 111 and the movable plate 112, respectively. The position of the hole 111$h$ of the fixed plate 111 is identical to an opening 101$p$ of the upper nozzle 101 and the position of the hole 112$h$ of the movable plate 112 is identical to an opening 102$p$ of the lower nozzle 102. With this configuration, if the movable plate 112 slides relative to the fixed plate 111, the opening 101$p$ of the upper nozzle 101 and the opening 102$p$ of the lower nozzle 102 are switched to be communicated or non-communicated with each other. This controls discharge or stop of the discharge of the molten steel from the molten steel vessel. Furthermore, the size of a space through which the opening 111$h$ of the fixed plate 111 and the opening 112$h$ of the movable plate 112 are communicated is changed so as to perform flow control of the molten steel.

Although the sliding nozzle 110 including two plates (the fixed plate 111 and the movable plate 112) is illustrated in FIG. 7, a sliding nozzle 120 including three plates of an upper fixed plate 121, a lower fixed plate 122, and a movable plate 123 has been used conventionally, as illustrated in FIG. 8. The upper fixed plate 121 is fixed to the upper nozzle 101 fixed to the bottom portion 90 of the molten steel vessel. The lower fixed plate 122 is unmovable and the lower nozzle 102 is attached to the lower fixed plate 122. The movable plate 123 slides between the upper fixed plate 121 and the lower fixed plate 122.

The plates used for the sliding nozzle as described above are severely damaged with use. For example, portions of the plates that make contact with the molten steel are eroded physically by the flowing molten steel. Furthermore, the temperature of the molten steel is extremely high, so that cracking is occurred on the plates due to thermal shock. The cracking is also occurred by structural spalling due to penetration of the molten steel into matrices of the plates. In addition, contents of a refractory material constituting the plates are lost because of elution into the molten steel or gasification, so that the matrices become porous. Moreover, the plates slide relatively, so that contact surfaces thereof are worn and the surface roughness is increased.

The endurance periods of the plates for the sliding nozzle used under such a severe environment are short and the plates need to be exchanged by brand-new plates, frequently. This arises a problem that the cost is increased. Furthermore, in order to avoid a significant trouble such as leakage of the molten steel, the plates are exchanged by the brand-new plates earlier than the usage limits thereof, resulting in waste of resources.

In order to solve the above problems, the present applicant has proposed a recycling method of performing processing for extending an endurance period on a used plate in the past (see, Japanese Patent No. 4980275). The recycling method is a method of impregnating a refractory layer of the used plate with tar or pitch, and then, heating it so as to remove a volatile component from the tar or the pitch. With this method, the tar or the pitch penetrates into cracking, recesses on the surface having the increased roughness, and increased opening pores that are occurred on the refractory layer of the plate with use so as to densify the refractory layer. Further, extension of the cracking is suppressed with an adhesiveness of the tar or the pitch. Accordingly, the above-mentioned recycling method is capable of extending the endurance period of the used plate. Moreover, the recycled plate can be distributed at lower cost than a brand-new product. This makes it possible to reduce the cost taken for maintaining the sliding nozzle and use resources effectively.

However, with the above-mentioned conventional method, when the recesses such as the cracking occurred on the plate with use are minute, the recesses can be repaired with the impregnation of the tar or the pitch but the recesses having large sizes at some degree cannot be repaired. For this reason, the used plate on which even less recesses having the large sizes have been occurred cannot be recycled with the above-mentioned method. In consideration of this, a technique that makes it possible to recycle even a plate on which recesses having large sizes have been occurred and widen a range of the used plate as a target for recycling has been required.

SUMMARY OF THE INVENTION

In view of the above-mentioned circumstances, an object of the invention is to provide a manufacturing method of a recycled plate, which is capable of repairing damage of a plate used for a sliding nozzle to extend an endurance period and widens a range of the used plate as a target for recycling, and a recycled plate that is manufactured by the manufacturing method.

In order to solve the above-mentioned problem, a manufacturing method of a recycled plate for a sliding nozzle (hereinafter, simply referred to as "manufacturing method" in some cases) according to an aspect of the invention includes performing, on a plate after having been used for the sliding nozzle, recycling processing including impregnating a matrix of the plate that is formed by a refractory brick with liquid containing at least one of tar and pitch, heating the plate impregnated with the liquid to remove a volatile component, and filling a recess having an opening width and a depth of equal to or smaller than 1 mm, which is present on a surface of the plate after having been impregnated with the liquid and heated, with a thermal expandable refractory material of which volume is increased by at least one of generation reaction and change in a crystal structure with heating when the plate attached to the sliding nozzle is used.

The "plate for the sliding nozzle" may be a plate that is used by combining two plates of a fixed plate and a movable plate as described above, or a plate that is used by combining three plates of an upper fixed plate, a lower fixed plate, and a movable plate sliding between the upper fixed plate and the lower fixed plate. Further, the relative sliding direction of the plate may be any of reciprocation and rotation. That is to say, the aspect of the invention can be applied to an arbitrary plate that slides relatively to the other plate so as to communicate or non-communicate the respective through-holes.

As the "refractory brick", refractory bricks of high alumina based refractory, alumina-magnesia based refractory, magnesia based refractory, zirconia based refractory, alumina-carbon based refractory, magnesia-carbon based refractory, alumina-magnesia-carbon based refractory, alumina-spinel-carbon based refractory, and alumina-zirconia-carbon based refractory can be exemplified.

The carbon based refractory brick has advantages such as high resistance to thermal shock, low thermal expansion coefficient, excellent resistance to chemical erosion, and low wettability to molten steel. Therefore, the carbon based refractory brick is suitable as the refractory brick constituting the plate that is used under the severe environment. On the other hand, the carbon based refractory brick has a disadvantage that it is easy to be oxidized if being heated in the atmosphere because it is carbon based. In addition, a carbon content of the molten steel is extremely low, so that the carbon is easy to be eluted into the molten steel from the carbon based refractory brick due to contact with the molten steel in the steel manufacturing process. That is to say, the carbon content of the carbon based refractory brick is lost with oxidization reaction and elution. Therefore, it is difficult to prevent the matrix from becoming porous. Accordingly, the aspect of the invention in which the matrix of the refractory brick is impregnated with the liquid containing at least one of the tar and the pith is suitable particularly as a manufacturing method of a recycled product of the plate formed by the carbon based refractory brick of which matrix becomes porous with use inevitably.

As "the tar or the pitch", dehydrated tar, coal pitch, and petroleum pitch can be exemplified. Although the coal pitch is classified into soft pitch (softening temperature of equal to or lower than approximately 70° C.), middle pitch (softening temperature of 70 to 85° C.), and hard pitch (softening temperature of equal to or higher than approximately 85° C.) based on the softening temperature, any of them can be used. Further, the liquid containing at least one of the tar and the pitch may be liquid containing at least only one of the tar and the pitch or may be liquid in which at least one of the tar and the pitch is diluted with a solvent. The pitch as a solid at a normal temperature is used in a state of being made into liquid by being heated to equal to or higher than the softening temperature or a state of being dissolved in a solvent.

The heating after the impregnation is performed in order to remove the volatile component contained in the tar and/or pitch impregnated into the matrix. Note that complete removable of the volatile component is not essential.

As the "thermal expandable refractory material of which volume is increased by generation reaction with heating", a refractory material containing a raw material with which ceramics having a lower density than the raw material is synthesized with heating can be used. Alternatively, a refractory material containing metallic powder with which metal oxide is generated by oxidization with heating can be used.

As the "thermal expandable refractory material of which volume is increased by change in a crystal structure with heating", a refractory material containing a ceramics material of which crystal structure is changed with heating to be transferred to a crystal phase having a lower density can be used.

With the manufacturing method, the tar and/or the pitch is made to penetrate into opening pore of the matrix that has become porous and brittle in the plate damaged with use. As a result, the opening pores are filled with the tar and/or the pitch and the matrix is densified. In addition, extension of cracking and enlargement of peeling are prevented with the adhesiveness of the tar or the pitch.

Further, the impregnation of the tar and/or the pitch can be performed by immersing the entire plate into liquid for impregnation. This enables the damage of the plate to be repaired entirely. With this, the peripheral edge of the through-hole through which the molten steel is distributed, the surface of the plate that makes contact with the molten steel while the discharge of the molten steel is stopped, and the surface that is damaged due to relative sliding between the plates can be repaired simultaneously.

When the recess occurred on the plate surface due to cracking, peeling, or the like is minute, the recess is filled by the impregnation of the tar and/or the pitch. However, when the opening width and the depth of the recess are large at some degree, the recess is not filled sufficiently by the impregnation of the tar and/or the pitch only. In order to cope with this, in the aspect of the invention, even the recess having such size that is not filled with the tar and/or the pitch sufficiently is filled with the thermal expandable refractory material. The thermal expandable refractory material filled into the recess is heated under a high-temperature environment when the plate is reused so as to thermally expand. That is to say, the recess is filled with the material that does not shrink thermally at a high temperature unlike common mortar, so that a state where the recess is filled is maintained long. Accordingly, a recycled plate of which endurance period is extended long can be manufactured with the manufacturing method. The recycled plate can be distributed at lower cost than a brand-new product. This makes it possible to reduce the cost taken for maintaining the sliding nozzle and use resources effectively.

Further, the manufacturing method makes it possible to recycle a used plate with the recess having such size that is not filled with the tar and/or the pitch, thereby widening a range of the used plate as a target for recycling. In addition, the manufacturing method is not influenced by the type and the size of the plate. Also in this point, a range of the used plate as a target for recycling is widened.

The size of the recess into which the thermal expandable refractory material is filled is set to "an opening width and a depth of equal to or smaller than 1 mm" for the following reason. That is, there arises a risk that filling into the recess having the opening width and the depth of larger than 1.0 mm with the thermal expandable refractory material becomes insufficient.

In the manufacturing method of the recycled plate for the sliding nozzle according to the aspect of the invention, it is preferable that "the plate on which the recycling processing has been performed be attached to the sliding nozzle, be used, and then, be detached from the sliding nozzle, and the recycling processing be performed on the plate, again".

Conventionally, the plate is reused once at most. On the other hand, with the aspect of the invention in which both of the impregnation of the tar and/or the pitch and the filling of the thermal expandable refractory material are performed, the plate that has been damaged with use is repaired at the high degree. With this, the above-mentioned configuration in which the recycled plate is attached to the sliding nozzle, is used, and then, the recycling processing is further performed thereon so as to obtain the recycled plate again can be employed.

Accordingly, with the manufacturing method, the endurance period of one plate is made longer. As a result, the cost for operating the sliding nozzle can be further reduced, thereby resources can be utilized more effectively.

Next, a recycled plate for the sliding nozzle according to another aspect of the invention is "a plate that is formed by a refractory brick, wherein an inner circumferential surface of an opening pore of a matrix is covered by at least one of tar and pitch, and a recess having an opening width and a depth of equal to or smaller than 1 mm, which is present on a surface of the matrix, is filled with a thermal expandable refractory material of which volume is increased by at least one of generation reaction and change in a crystal structure with heating when the plate attached to the sliding nozzle is used."

The recycled plate having such configuration is manufactured by the above-mentioned manufacturing method, that is, the method including "performing, on a plate after having been used for the sliding nozzle, recycling processing including impregnating a matrix of the plate that is formed by a refractory brick with liquid containing at least one of tar and pitch, heating the plate impregnated with the liquid to remove a volatile component, and filling a recess having an opening width and a depth of equal to or smaller than 1 mm, which is present on a surface of the plate after having impregnated with the liquid and heated, with a thermal expandable refractory material of which volume is increased by at least one of generation reaction and change in a crystal structure with heating when the plate attached to the sliding nozzle is used."

As described above, as an effect of the invention, a manufacturing method of a recycled plate, which is capable of repairing damage of a plate used for a sliding nozzle to extend an endurance period and widens a range of the used plate as a target for recycling, and a recycled plate that is manufactured by the manufacturing method can be provided.

DESCRIPTION OF THE EMBODIMENTS

Figure 3:
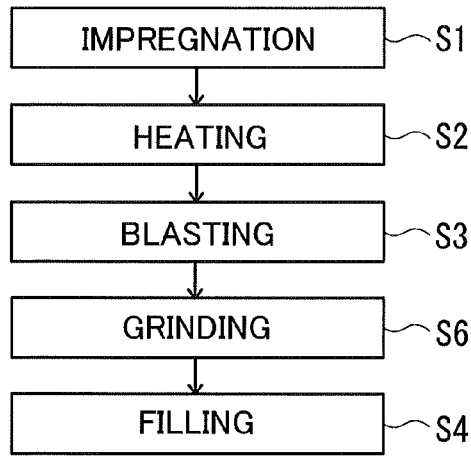
FIG. 3 is a flowchart of recycling processing in a manufacturing method according to a third embodiment.
Figure 4:
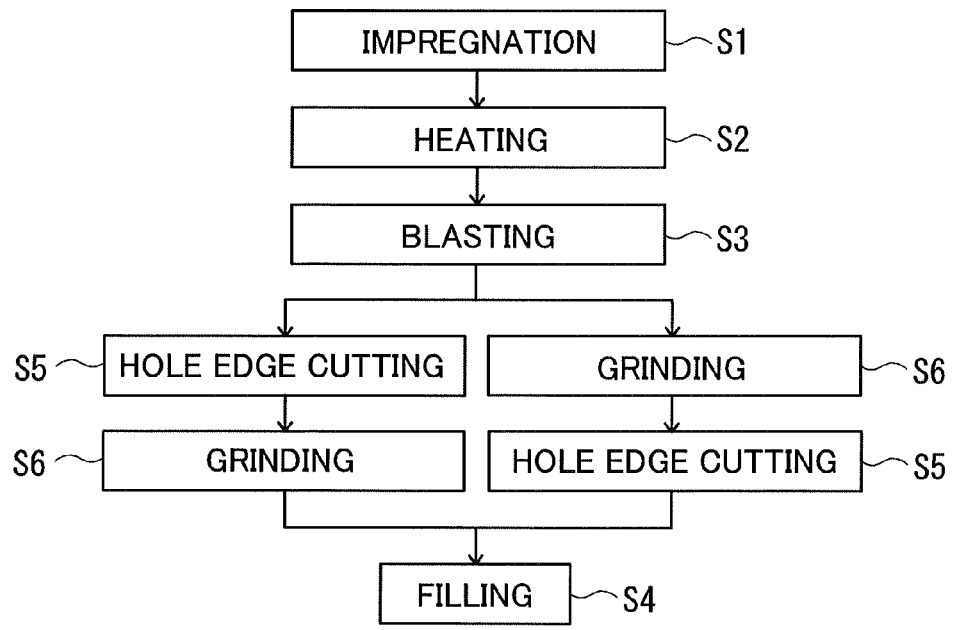
FIG. 4 is a flowchart of recycling processing in a manufacturing method according to a fourth embodiment.
Figure 5:
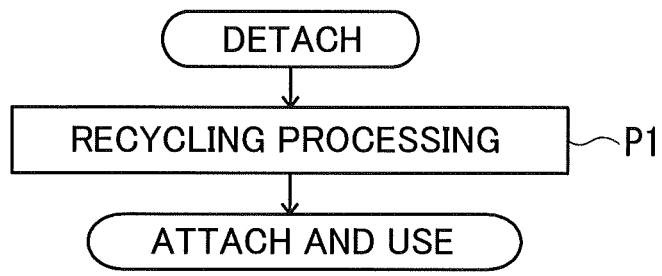
FIG. 5 is a flowchart of a manufacturing method in which the recycling processing is performed once.

Hereinafter, described are specific embodiments of the invention with reference to FIG. 1 to FIG. 6. In any of manufacturing methods according to a first embodiment to a fourth embodiment, a used plate is detached from a sliding nozzle, recycling processing P1 is performed on the used plate, and a manufactured recycled plate is attached to the sliding nozzle, is used again, as illustrated in FIG. 5.

Figure 1:
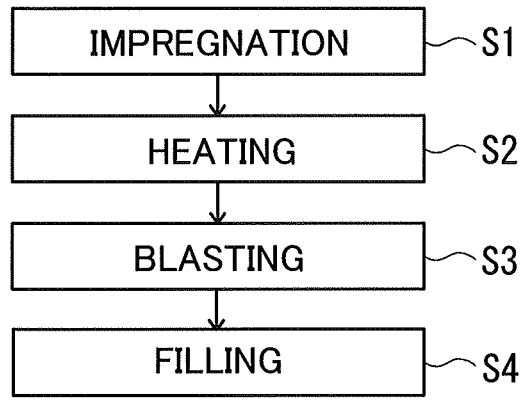
FIG. 1 is a flowchart of recycling processing in a manufacturing method according to a first embodiment.

The recycling processing P1 in the manufacturing method according to the first embodiment is performed in the order of impregnation S1, heating S2, blasting S3, and filling S4 as the flow thereof is illustrated in FIG. 1.

Impregnation S1:

A used plate is immersed in liquid containing at least one of tar and pitch so as to impregnate a matrix of the plate with the liquid. The viscosity of the liquid for impregnation is changed by heating or diluting the liquid so as to adjust the easiness of penetration of the liquid into the matrix. If opening pores of the matrix are deaerated while the used plate is placed at a reduced pressure before the impregnation, the matrix is impregnated with the liquid effectively. A larger amount of liquid can be made to penetrate into the matrix forcibly by impregnating the matrix with the liquid while pressurizing the liquid.

Contents of the matrix of the used plate are lost because of elution into molten steel or gasification, so that the opening pores are increased. The liquid containing the tar and/or the pitch penetrates into the opening pores and a layer of the tar and/or the pitch is formed. Further, recesses such as cracking and peeling traces are formed on the surface of the plate and the tar and/or the pitch is also filled into the minute recesses.

Heating S2:

Heating conditions can be set to 200° C. to 400° C. (baking) and 500° C. to 700° C. (caulking). Heating removes a volatile component from the tar and/or the pitch impregnated into the matrix of the plate. This prevents smoking from the plate while the plate is used by being attached to the sliding nozzle.

Blasting S3:

Residues of the tar and/or the pitch remain on the surface of the plate after heated. Then, blasting particles (projection materials) are blasted onto the surface of the plate so as to remove the residues. The conditions such as a type, a particle diameter, and a blasting speed of the blasting particles can be set appropriately in accordance with the type of the refractory brick constituting the plate, the type of the tar and/or the pitch, and the like.

Filling S4:

The recesses having the opening widths and the depths of equal to or smaller than 1 mm are filled with a thermal expandable refractory material of which volume is increased by at least one of generation reaction and change in a crystal structure with heating when the plate attached to the sliding nozzle is used. With this, the recesses that have not been sufficiently filled with the tar and/or the pitch in the impregnation S1 are filled with the thermal expandable refractory material. It is to be noted that the recesses having the opening widths and the depths of equal to or smaller than 0.01 mm have been filled with the tar and/or the pitch in the impregnation S1. Therefore, it is sufficient that the recesses having the opening widths and the depths of equal to or larger than 0.01 mm and equal to or smaller than 1.0 mm are filled with the thermal expandable refractory material.

As the thermal expandable refractory material, (1) a material obtained by kneading a refractory material containing raw materials with which ceramics having a lower density than the raw materials is synthesized with heating with a liquid medium (water, organic solvent), (2) a material obtained by kneading a refractory material containing metallic powder with which metal oxide is generated by oxidization with heating with the liquid medium (water, organic solvent), or (3) a material obtained by kneading a refractory material containing a ceramics material of which crystal structure is changed with heating to be transferred to a crystal phase having a lower density with the liquid medium (water, organic solvent) can be used.

(1) As the raw materials with which ceramics having a lower density than the raw materials is synthesized with heating, aluminum oxide and silicon dioxide with which mullite is synthesized with heating, magnesium oxide and aluminum oxide with which spinel is synthesized with heating, and titanium oxide and aluminum oxide with which aluminum titanate is synthesized with heating can be exemplified.

Then, described is the change in volume by the synthesis (generation reaction) of mullite. Molecular weights and densities of aluminum oxide ($Al_2O_3$), silicon dioxide ($SiO_2$), and mullite ($3Al_2O_3.2SiO_2$) are as follows:

Aluminum oxide: molecular weight 102, density 3.99 (as corundum)

Silicon dioxide: molecular weight 60, density 2.53 (as quartz)

Mullite: molecular weight 426, density 3.17

Accordingly, the volume after generation of 1 mol of mullite is increased in comparison with that before the generation as follows:

Volume before generation ($3Al_2O_3+2SiO_2$): 124.1 $cm^3$

Volume after generation ($3Al_2O_3.2SiO_2$): 134.4 $cm^3$

Described is the change in volume by synthesis (generation reaction) of spinel. Molecular weights and densities of magnesium oxide (MgO), aluminum oxide ($Al_2O_3$), and spinel ($MgO.Al_2O_3$) are as follows:

Magnesium oxide: molecular weight 40, density 3.65

Aluminum oxide: molecular weight 102, density 3.99 (as corundum)

Spinel: molecular weight 142, density 3.60

Accordingly, the volume after generation of 1 mol of spinel is increased in comparison with that before the generation as follows:

Volume before generation ($MgO+Al_2O_3$): 36.5 $cm^3$

Volume after generation ($MgO.Al_2O_3$): 39.4 $cm^3$

Described is the change in volume by synthesis (generation reaction) of aluminum titanate. Molecular weights and densities of titanium oxide (TiO), aluminum oxide ($Al_2O_3$), and aluminum titanate ($TiO_2.Al_2O_3$) are as follows:

Titanium oxide: molecular weight 80, density 4.25 (as rutile)

Aluminum oxide: molecular weight 102, density 3.99 (as corundum)

Aluminum titanate: molecular weight 182, density 3.65

Accordingly, the volume after generation of 1 mol of aluminum titanate is increased in comparison with that before the generation as follows:

Volume before generation ($TiO_2+Al_2O_3$): 44.3 $cm^3$

Volume after generation ($TiO_2.Al_2O_3$): 49.8 $cm^3$

The metal oxides as the raw materials with which composite oxide ceramics having a lower density than the raw materials is synthesized with heating, such as aluminum oxide, silicon dioxide, magnesium oxide, and titanium oxide, have average particle diameters of 0.1 µm to 20 µm desirably, and 0.1 µm to 10 µm more desirably. If the metal oxides are fine particles having the average particle diameters in the above-mentioned range, composite oxide ceramics (mullite, spinel, aluminum titanate) is easy to be generated with heating. Therefore, an action of increasing the volume of the thermal expandable refractory material with heating is easy to be exhibited. It is to be noted that the particle diameter can be obtained as a diffraction scattering diameter by a laser diffraction scattering method.

The ratios of the aluminum oxide and the silicon dioxide as the raw materials for generating mullite are set to be ratios closer to the stoichiometric composition of mullite. With this, substantially the total volume of the aluminum oxide and the silicon dioxide are turned into mullite and the degree of the increase in the volume of the thermal expandable refractory material under heating can be made large. The degree of the increase in the volume of the thermal expandable refractory material under heating can be adjusted by shifting the ratios of the aluminum oxide and the silicon dioxide as the raw materials for generating mullite from the stoichiometric composition of mullite. The same holds true for ratios of the magnesium oxide and the aluminum oxide as the raw materials for generating spinel and ratios of the titanium oxide and the aluminum oxide as the raw materials for generating aluminum titanate.

As the thermal expandable refractory material with which mullite is synthesized with heating, for example, a material obtained by kneading the refractory material having the following composition with water or an organic solvent can be exemplified:

$Al_2O_3$ (average particle diameter: 5 µm) 71 mass %

$SiO_2$ (average particle diameter: 1 µm) 24 mass %

Other contents (binder and the like) 5 mass %

As the thermal expandable refractory material with which spinel is synthesized with heating, a material obtained by kneading the refractory material having the following composition with water or an organic solvent can be exemplified. It is to be noted that the following composition is an example of the thermal expandable refractory material of which degree of thermal expansion is suppressed by lowering the ratio of magnesium oxide.

MgO (average particle diameter: 20 µm) 5 mass %

$Al_2O_3$ (average particle diameter: 5 µm) 92 mass %

Other contents (binder and the like) 3 mass %

The conventional refractory mortar that is used for bonding refractory bricks and forms a joint portion is obtained by mixing the refractory material and clay or a liquid glass as a binder (plasticizer) and kneading the mixed material with water generally. As the refractory material, aluminum oxide, silicon dioxide, and magnesium oxide are used in addition to dolomite, mullite, spinel, and the like in some cases. However, the powder of the refractory material for the conventional refractory mortar has a course average particle diameter as much as equal to larger than 70 µm. Therefore, even when aluminum oxide and silicon dioxide are contained at ratios overlapping with the above-mentioned composition, mullite is not generated with heating. Further, even when magnesium oxide and aluminum oxide are contained at ratios overlapping with the above-mentioned composition, spinel is not generated with heating.

(2) As the refractory material containing metallic powder with which metal oxide is generated by oxidization with heating, a refractory material containing powder of aluminum and a refractory material containing powder of iron can be exemplified. Further, the refractory material can contain aluminum oxide, mullite, spinel, or the like in addition to the metallic powder. The metallic powder reacts with water to generate heat and generate hydrogen gas. Therefore, the refractory material containing the metallic powder is used by being kneaded with an organic solvent or a liquid medium containing an organic solvent at a high ratio desirably.

(3) As the refractory material containing a ceramics material of which crystal structure is changed with heating to be transferred to a crystal phase having a lower density, a refractory material containing fine quartz powder can be exemplified. Cristobalite is precipitated from the fine quartz with heating. The cristobalite transforms to the α-cristobalite from the β-cristobalite at approximately 230° C. and the volume thereof is increased.

After the recesses have been filled with the thermal expandable refractory material, the plate is heated at the temperature of 100° C. to 300° C. so as to dry the thermal expandable refractory material.

Figure 2:
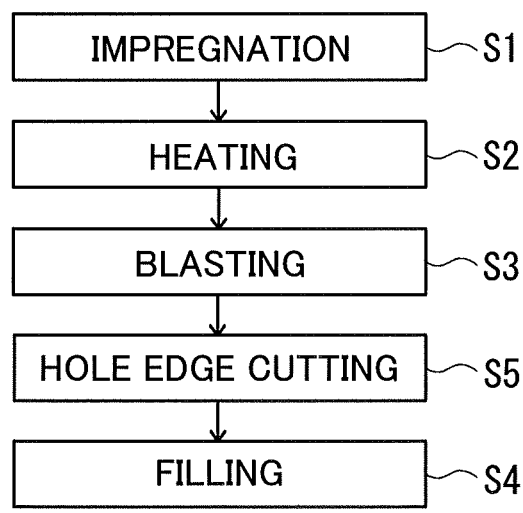
FIG. 2 is a flowchart of recycling processing in a manufacturing method according to a second embodiment.

Next, described is the manufacturing method according to the second embodiment. The second embodiment is different from the first embodiment in that hole edge cutting is further performed on the plate in the recycling processing P1. The recycling processing P1 in the manufacturing method according to the second embodiment is performed in the order of the impregnation S1, the heating S2, the blasting S3, the hole edge cutting S5, and the filling S5, as illustrated in FIG. 2.
Hole Edge Cutting S5:

A peripheral edge of a through-hole on the used plate is cut by a cutting tool. The through hole of the common plate has a circular cross-sectional shape and is cut concentrically. Since the impregnation S1 is performed before the hole edge cutting S5, the matrix of the plate that has become porous and brittle with use is densified. This makes it possible to perform mechanical cutting easily and cut the peripheral edge of the through-hole well.

The peripheral edge of the through-hole on the plate is a portion that is damaged at the most significant level. As a reason of this, the peripheral edge of the through-hole of the plate is easy to be eroded physically by the molten steel flowing down the through-hole and cracking due to thermal shock is easy to be occurred thereon with contact with the molten steel at a high temperature. The peripheral edge of the through-hole is cut so as to remove a portion that has been damaged at the most significant level. With this, the inner wall of the through-hole becomes a new surface that is less damaged, so that resistance to the molten steel is restored. Accordingly, the recycling processing P1 includes the hole edge cutting S5 so as to recycle a used plate of which peripheral edge of the through-hole has been largely damaged, thereby widening a range of the used plate as a target for recycling.

Although the through-hole of the plate is enlarged by the hole edge cutting S5, the plate is used as a recycled plate while keeping the size of the through-hole. For example, there are common sliding nozzles of a plurality of types having different nozzle opening diameters of 60 mm, 65 mm, 70 mm, and the like. When the sliding nozzles of the plurality of types having the different nozzle opening diameters are used in the same facility, a plate used for the sliding nozzle having a smaller nozzle diameter is recycled and can be attached to the sliding nozzle having a larger nozzle diameter to be reused. Further, if the diameters of the through-holes of the plates that are overlapped and slide relatively are different, control of discharge and stop of the discharge of the molten steel and flow control can be performed with no special problem.

Next, described is the manufacturing method according to the third embodiment. The third embodiment is different from the first embodiment in that grinding of the plate surface is further performed in the recycling processing P1. The recycling processing P1 in the manufacturing method according to the third embodiment is performed in the order of the impregnation S1, the heating S2, the blasting S3, the grinding S6, and the filling S4, as illustrated in FIG. 3.
Grinding S6:

The plate surface is grinded by a grinder. For example, a grinder including a disc-like grinding stone is used and the plate surface is grinded by moving the grinder in parallel with the plate surface while rotating the grinding stone around an axis perpendicular to a plane of the plate. In this case, the grinding can be performed such that the surface of the plate is removed by 0.5 mm to 1.0 mm. Since the impregnation S1 is performed before the grinding S6, the matrix of the plate that has become porous and brittle with use is densified. This makes it possible to perform mechanical grinding easily and suppress peeling of the plate surface with the grinding.

The grinding S6 makes the plate surface smooth and reduce the number of recesses having such large sizes that have not been filled with the tar and/or the pitch in the impregnation S1. Further, the recesses that remain after the grinding S6 become shallower than that before the grinding S6. Therefore, in the filling S4 that is to be performed subsequently, the recesses are filled with the refractory material sufficiently. Accordingly, the recycling processing P1 includes the grinding S6 so as to recycle a used plate with recesses having large sizes, thereby a range of the used plate as a target for recycling is widened.

In particular, the surface of the plate surfaces at the side that slides relatively to the other plate is damaged largely because the surface is rubbed while receiving a load. Since the lower plate of the rubbed two plates is kept making contact with the molten steel while the discharge of the molten steel is stopped, the lower plate is damaged largely. Therefore, it is effective to perform the grinding S6 on at least the surface of the plate surfaces at the side that slides relatively to the other plate.

The plate is made thinner than the original thickness by the grinding S6. Then, a plate material is bonded to the surface opposite to the surface of the plate that slides relatively to the other plate so as to adjust the thickness. In order to prevent the molten steel from being leaked from the contact surface with the other plate to which the plate slides relatively, large pressures are applied to the plate attached to the sliding nozzle from the upper and lower sides. For example, the pressure of 40 kN to 100 kN is applied by a spring member energizing such that frame members supporting the respective overlapped plates at the upper side and the lower side pressurize each other. Accordingly, the thickness of the plate material to be bonded to the plate after the grinding is set desirably such that the thickness of the plate to which the plate material has been bonded is equal to the thickness of the original plate in a state where the plate is attached to the sliding nozzle and the pressure is applied to the plate and the other plate from the upper and lower sides. If the thickness of the recycled plate in a state of being used is set to the thickness of the original plate in this manner, an additional member for adjustment for abutting two plates that are made to slide relatively is not required when the recycled plate is attached to the sliding nozzle to be used. The bonding of the plate material can be performed before or after the filling S4.

Next, described is the manufacturing method according to the fourth embodiment. In recycling processing P1 in the fourth embodiment, hole edge cutting S5 is further performed in addition to the recycling processing P1 in the third embodiment. The hole edge cutting S5 can be performed before or after the grinding S6. That is to say, the recycling processing P1 in the manufacturing method according to the fourth embodiment may be performed in the order of the impregnation S1, the heating S2, the blasting S3, the hole edge cutting S5, the grinding S6, and the filling S4 or in the order of the impregnation S1, the heating S2, the blasting S3, the grinding S6, the hole edge cutting S5, and the filling S4, as illustrated in FIG. 4. In the former case, bonding of the plate material that is performed after the grinding S6 can be performed before or after the filling S4. In the latter case, bonding of the plate material that is performed after the grinding S6 can be performed before or after the hole edge cutting S5 or after the filling S4.

The recycling processing P1 includes the hole edge cutting S5 and the grinding S6 in addition to the filling S4. This makes it possible to recycle a used plate that has been largely damaged, thereby widening a range of the used plate as a target for recycling.

The used plate becomes a recycled plate with the manufacturing method according to the above-mentioned embodiments. The recycled plate manufactured by the manufacturing method according to the first embodiment to the forth embodiment is a plate that is formed by a refractory brick. On the recycled plate, inner circumferential surfaces of the opening pores of the matrix are covered by at least one of tar and pitch, and recesses having opening widths and depths of equal to or smaller than 1 mm in a state where at least a part of the inner circumferential surfaces thereof are covered by the tar and/or the pitch, which are present on the surface of the matrix, are filled with the thermal expandable refractory material of which volume is increased by at least one of generation reaction and change in a crystal structure with heating. The state where the "inner circumferential surfaces of the opening pores are covered by at least one of the tar and the pitch" encompasses a state where the opening pores are completely filled with the tar and/or the pitch and a state where the opening pores are partially filled with the tar and the pitch.

If the recycled plate having the configuration is attached to the sliding nozzle to be reused, the recycled plate is heated under a high-temperature environment when used and the thermal expandable refractory material filled into the recesses expand. Thus, the recesses are filled with a material that does not shrink with heating, so that the state where the plate is repaired is maintained long. This makes it possible to extend the endurance period of the plate longer than that in the conventional technique.

As described above, with the manufacturing methods according to the first embodiment to the fourth embodiment, even the plate having such large damage that cannot have been repaired conventionally can be recycled by performing the impregnation S1 and the filling S4. This widens a range of the used plate as a target for recycling in comparison with the conventional technique.

Figure 6:
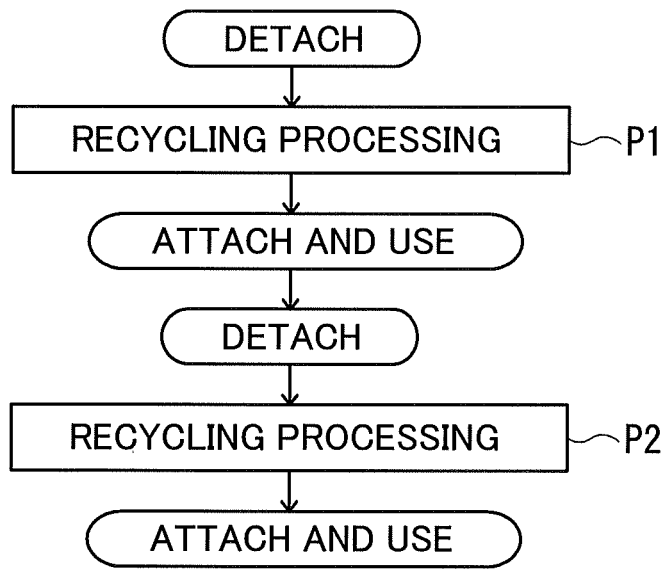
FIG. 6 is a flowchart of a manufacturing method in which the recycling processing is performed twice.
Figure 7:
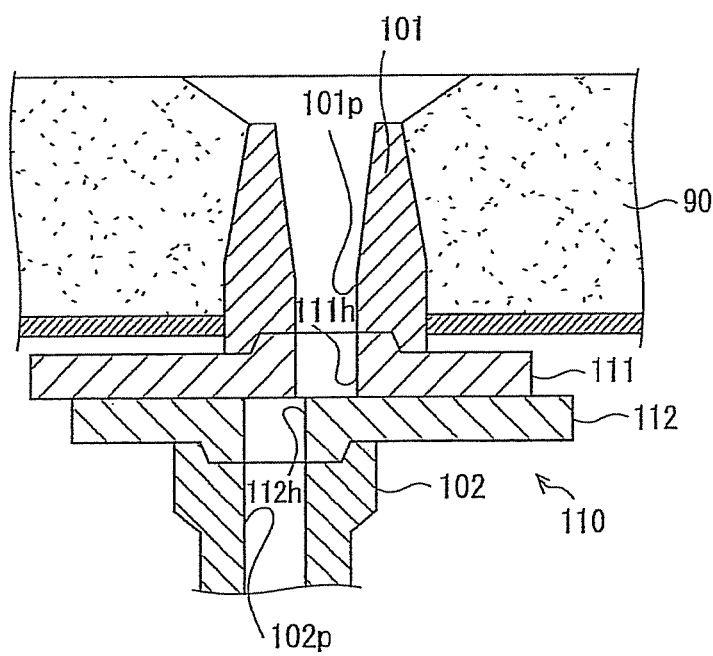
FIG. 7 is a cross-sectional view illustrating a common sliding nozzle including two plates.
Figure 8:
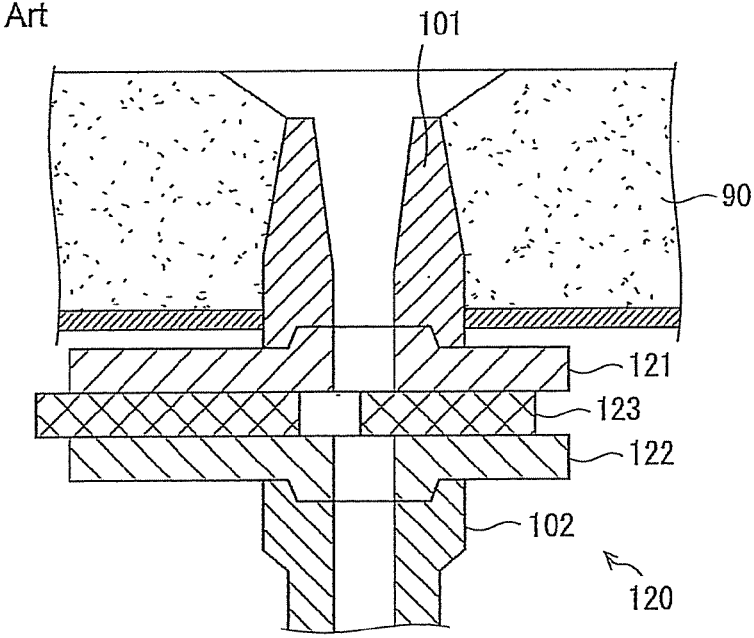
FIG. 8 is a cross-sectional view illustrating a common sliding nozzle including three plates.

Further, the degree that the plate damaged with use is repaired is higher in comparison with the conventional technique. This makes it possible to employ a manufacturing method in which the recycling processing of recycling a used plate to the recycled plate is performed a plurality of times. For example, as illustrated in FIG. 6, the following manufacturing method can be employed. That is, a plate is detached from a sliding nozzle, and a recycled plate subjected to the first recycling processing P1 is attached to the sliding nozzle to be used. After using, the recycled plate is detached and second recycling processing P2 is performed thereon to obtain a recycled plate.

In the manufacturing method, the second recycling processing P2 can be performed in the same manner as the above-mentioned recycling processing P1. That is to say, the recycling processing P2 (S1-S2-S3-S4) same as the recycling processing P1 in the manufacturing method according to the first embodiment, the recycling processing P2 (S1-S2-S3-S5-S4) same as the recycling processing P1 in the manufacturing method according to the second embodiment, the recycling processing P2 (S1-S2-S3-S6-S4) same as the recycling processing P1 in the manufacturing method according to the third embodiment, or the recycling processing P2 (S1-S2-S3-S5-S6-S4 or S1-S2-S3-S6-S5-S4) same as the recycling processing P1 in the manufacturing method according to the fourth embodiment can be performed. The above recycling processing P1 and the recycling processing P2 can be combined appropriately.

As described above, the invention has been described by taking preferable embodiments as examples. However, the invention is not limited to the above-mentioned embodiments and various improvements and changes in design can be made in a range without departing from a scope of the invention as follows.

For example, the manufacturing method of performing the recycling processing once and the manufacturing method of performing the recycling processing twice have been described above. However, the invention is not limited thereto and the invention can be applied to a manufacturing method of performing the recycling processing equal to or more than three times.

The recycled plate manufactured by the manufacturing method according to the invention can be used by combining with another recycled plate or by combining with a brand-new plate.

What is claimed is:

1. A manufacturing method of a recycled plate for a sliding nozzle, the method comprising performing, on a plate after having been used for the sliding nozzle, recycling processing including:
    impregnating a matrix of the plate that is formed by a refractory brick with liquid containing at least one of tar and pitch;
    heating the plate impregnated with the liquid to remove a volatile component, and
    filling a recess having an opening width and a depth of equal to or smaller than 1 mm, which is present on a surface of the plate after having been impregnated with the liquid and heated, with a thermal expandable refractory material of which volume is increased by at least one of generation reaction and change in a crystal structure with heating when the plate attached to the sliding nozzle is used.

2. The manufacturing method of the recycled plate for the sliding nozzle according to claim 1, wherein
    the plate on which the recycling processing has been performed is attached to the sliding nozzle, is used, and then, is detached from the sliding nozzle, and the recycling processing is performed on the plate, again.

3. A recycled plate for a sliding nozzle, which is a plate that is formed by a refractory brick, wherein
    an inner circumferential surface of an opening pore of a matrix is covered by at least one of tar and pitch, and
    a recess having an opening width and a depth of equal to or smaller than 1 mm, which is present on a surface of the matrix, is filled with a thermal expandable refractory material of which volume is increased by at least one of generation reaction and change in a crystal structure with heating when the plate attached to the sliding nozzle is used.

* * * * *